United States Patent [19]

Porosky

[11] Patent Number: 5,228,226
[45] Date of Patent: Jul. 20, 1993

[54] GAFF AND MEASURING DEVICE

[76] Inventor: Theodore Porosky, Lake Como, Pa. 18437

[21] Appl. No.: 879,192

[22] Filed: May 6, 1992

[51] Int. Cl.$^5$ ............................................. A01K 97/14
[52] U.S. Cl. ......................................... 43/5; 294/26; 33/485
[58] Field of Search ................... 43/5; 33/485; 294/26

[56] References Cited

U.S. PATENT DOCUMENTS

| 180,521 | 8/1876 | Beach | 33/485 |
| 302,097 | 7/1884 | Call | 33/485 |
| 314,507 | 3/1885 | Yonge | 33/485 |
| 419,268 | 1/1890 | Low | 33/485 |
| 731,916 | 6/1903 | Koegel | 33/485 |
| 1,555,653 | 9/1925 | Frank | 33/485 |
| 2,501,757 | 3/1950 | Cagle | 33/485 |
| 2,570,538 | 10/1951 | Fincher et al. | 294/26 |

*Primary Examiner*—Kurt C. Rowan
*Attorney, Agent, or Firm*—Kane, Dalsimer, Sullivan, Kurucz, Levy, Eisele and Richard

[57] ABSTRACT

A gaff and measuring device is a hook connected to a measuring means. The gaff and measuring device also includes a handle and a lever to provide extra stability in maneuvering the hook and measuring means. The lever is also used as a surface against which the fish can be place while being measured.

4 Claims, 1 Drawing Sheet

GAFF AND MEASURING DEVICE

BACKGROUND OF THE INVENTION

1. Field of the Invention

The present invention relates to a hook attached to a device which measures a fish's length.

2. Description of the Prior Art

In the sport of ice fishing, the fisherman has many concerns. First, the fisherman must create a hole in the ice with an ax or an auger. This hole usually has a diameter of no more than six to eight inches. This small hole prevents some devices such as fish nets from being placed into the water to retrieve the caught fish. In addition, the fisherman will encounter great difficulty in removing the fish from the water with only his pole and line since his pole and line can be unstable and not rigid. Finally, the fisherman cannot use his hands to pull the fish from the water because the waters are icy cold.

A second concern of the fisherman is certain fish and game laws require a caught fish to be a certain length or else the fish must be returned to the water. Thus, a fisherman wants to be able to remove the fish from the water and to measure the fish without killing or damaging the fish. In addition, the fisherman wants to be able to quickly and easily measure the fish. If this measurement cannot be quickly accomplished, then the fish may die in the interim before it is returned to the water.

Previous devices provide separate solutions to both of these concerns. Examples of these devices are a pocket scale, a fishing pole with a scale mounted on the rod, and a device as shown in U.S. Pat. No. 1,964,425. All of these devices perform the tasks of either retrieving the fish from the water or measuring the fish's length but none of these previous solutions attack the above two problems together.

Pocket scales allow one to measure the fish's length but are awkward to use. The fisherman must hold the scale with one hand while using his other hand to hold the line on the end of which is the hooked fish. Meanwhile, the live fish is jumping around thus preventing the fisherman from easily aligning the fish along the scale.

Both the fishing pole with a scale mounted on the rod and the device shown in U.S. Pat. No. 1,964,425 allow the fisherman to retrieve the fish from the water without using his hand and then to measure the fish's length. The fisherman now has to hold the flexible pole steady with one hand and hold the line, on the end of which is the hooked fish, with his other hand. As with the pocket scale, the live fish will be jumping around thus preventing the fisherman from easily aligning the fish along the scale.

Therefore, an object of the present invention is to provide a hook connected to a measuring device to retrieve a live fish from the water without killing or damaging the fish.

Another object of the present invention is to provide a hook connected to measuring device which has a great amount of stability in retrieving the fish from the water.

Another object of the present invention is to provide a hook connected to a measuring device to measure the length of a live fish without damaging the live fish.

Another object of the present invention is to provide a hook connected to a measuring device to quickly and easily measure the length of a live fish in case the live fish needs to be returned to the water.

SUMMARY OF THE INVENTION

The above and other beneficial objects and advantages are attained in accordance with the present invention by providing a hook to pull the fish out of the water without damaging the fish. The hook is connected to a measuring means to allow the fisherman to quickly measure the length of the fish after the fish is removed from the water. The device also has a handle on one end to allow the fisherman to securely hold the device while retrieving the fish from the water.

DETAILED DESCRIPTION OF THE PREFERRED EMBODIMENT

Figure 1:
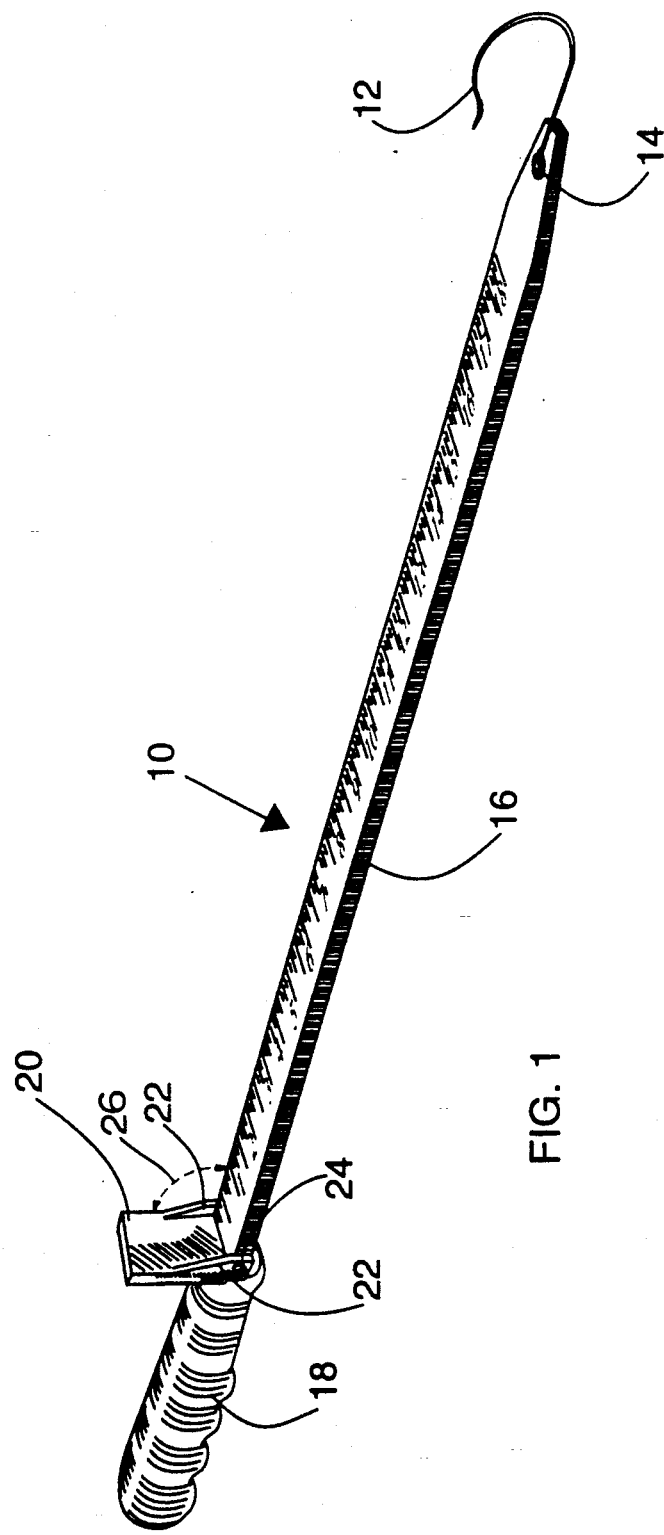
FIG. 1 discloses a perspective view of the present invention.

Referring to the drawings in detail wherein like numerals indicate like elements throughout the one view, FIG. 1 discloses a gaff and measuring device 10. Gaff and measuring device 10 includes a hook 12. The size of hook 12 is not large enough to damage a fish when hook 12 is used to hook a live fish. Hook 12 is at one end of a measuring device 16 and attaches to measuring device 16 by means of a screw 14. Measuring device 16 is a rigid member extending from hook 12. Marks indicating divisions of length (e.g. inches or centimenters) run along the entire surface of measuring device 16 from hook 12 to a lever 20. A handle 18 is connected to measuring device 16 at the end opposite hook 12 and lever 20 is attached to measuring device 16 at this point where measuring device 16 meets handle 18. The shape of handle 18 allows a person's hand to comfortable grip the gaff and measuring device 10 and to easily maneuver the gaff and measuring device 10. Lever 20 can pivot from a position flat against measuring device 16 to a position perpendicular to measuring device 16. Lever 20 contains flanges 22 which extend beyond the end of lever 20 to embrace measuring device 16. Flanges 22 are then secured to measuring device 16 by means of screws 24 around which lever 20 pivots between lever 20's two positions as shown by the dashed arrow 26.

To utilize the gaff and measuring device 10, the fisherman grips the gaff and measuring device 10 by wrapping his hand around handle 18. He then maneuvers hook 12 into the water so that hook 12 engages with the fish's mouth. If the fish is jumping around in an extraordinary fashion, the fisherman can move lever 20 to its perpendicular position and then place his thumb on lever 20 to provide him more stability in pulling the fish out of the water. The fisherman pulls the fish out of the water and places the fish and the gaff and measuring device on the ground. He disengages hook 12 from the fish's mouth. The fisherman places lever 20 in its perpendicular position. He positions the fish along measuring device 16 with one end of the fish buttressed against lever 20. If the fish's length is within the legal limits, the fisherman can then keep the fish. If the fish's length is not within legal limits, the fisherman can return the liver fish unharmed back to the water.

The aforementioned objects and advantages are effectively attained. However many modifications and variations of the invention are possible in light of the above description of the preferred embodiment. Therefore, the invention may be practiced in manners otherwise than as specifically described and may still be within the scope of the appended claims.

What is claimed is:

1. A gaff and measuring device allowing a fisherman to easily remove a live fish undamaged from a small hole in the ice covering a body of water and allowing the fisherman to quickly measure the length of said live fish to ascertain whether said fish can be kept or must be returned to the water and comprising a hook for hooking said fish and facilitate removal of said fish from the water, a rigid length indicating means attached to said hook for measuring the length of said fish, said rigid length indicating means being interposed between said hook and a handle which facilitates manipulation of said hook while hooking a fish, and a lever being connected to said rigid length indicating means and pivots from a position flat against said rigid length indicating means to a position perpendicular to said rigid length indicating means where the lever provides extra stability in maneuvering said hook and provides a surface to place the fish against when measuring the fish.

2. The gaff and measuring device of claim 1 wherein said rigid length indicating means contains a scale to measure length.

3. The gaff and measuring device of claim 2 wherein said rigid length indicating means is a scale of predetermined length.

4. The gaff and measuring device of claim 3 wherein said rigid length indicating means is a structural member between said hook and said handle providing stability in maneuvering said hook and said measuring device.

* * * * *